US006874772B2

(12) United States Patent
Oldenettel

(10) Patent No.: US 6,874,772 B2
(45) Date of Patent: Apr. 5, 2005

(54) METHOD FOR CONTROLLING THE STORAGE PRESSURE IN A CLOSED LEVEL CONTROL SYSTEM

(75) Inventor: Holger Oldenettel, Wedemark (DE)

(73) Assignee: Continental Aktiengesellschaft, Hannover (DE)

(*) Notice: Subject to any disclaimer, the term of this patent is extended or adjusted under 35 U.S.C. 154(b) by 255 days.

(21) Appl. No.: 10/140,811

(22) Filed: May 9, 2002

(65) Prior Publication Data

US 2002/0166321 A1 Nov. 14, 2002

(30) Foreign Application Priority Data

May 10, 2001 (DE) .......................... 101 22 567

(51) Int. Cl.[7] .............................. F16F 9/43; B60G 11/26
(52) U.S. Cl. .............................. 267/64.28; 280/5.514; 280/124.16
(58) Field of Search ................ 267/64.28; 280/124.104, 280/124.106, 124.151, 124.16, 124.159, 124.158, 124.161, 5.514

(56) References Cited

U.S. PATENT DOCUMENTS

| 4,354,693 | A |   | 10/1982 | Maeda et al. |              |
|-----------|---|---|---------|--------------|--------------|
| 4,858,895 | A | * | 8/1989  | Buma et al.  | ..... 267/64.16 |
| 5,794,924 | A | * | 8/1998  | Stolpp       | ..... 267/64.11 |
| 6,173,974 | B1| * | 1/2001  | Raad et al.  | ..... 280/6.157 |
| 6,189,903 | B1| * | 2/2001  | Bloxham      | ..... 280/124.16 |
| 6,266,590 | B1| * | 7/2001  | Kutscher et al. | ..... 701/37 |
| 6,523,845 | B2| * | 2/2003  | Stiller      | ..... 280/124.16 |
| 6,685,174 | B2| * | 2/2004  | Behmenburg et al. | ..... 267/64.28 |

FOREIGN PATENT DOCUMENTS

EP          1 078 784          2/2001

OTHER PUBLICATIONS

U.S. Appl. No. 09/733,046, filed Dec. 11, 2000, Behmenburg et al.

* cited by examiner

Primary Examiner—Robert A. Siconolfi
(74) Attorney, Agent, or Firm—Walter Ottesen

(57) ABSTRACT

A method for controlling the storage pressure of a pressurized air store (4) of a closed level control system for a motor vehicle includes a compressor (6), a pressurized air store (4) (which can be filled with air from the atmosphere and which can be discharged into the atmosphere) and at least one air spring (2a to 2d). The air springs (2a to 2d) are connected via the compressor (6) to the pressurized air store (4) so that pressurized air from the air springs (2a to 2d) can be transferred into the pressurized air store (4) and can be transferred in the opposite direction. The storage pressure of the pressurized air store (4) is controlled indirectly via the air quantity in the level control system in that this air quantity is determined. The pressurized air store (4) is filled with air from the atmosphere when the air quantity lies below a lower limit and the pressurized air store (4) is discharged into the atmosphere when the air quantity lies above an upper limit. The control is undertaken in such a manner that the air quantity, after filling or discharging, lies in an operating range between the lower and upper limits.

10 Claims, 2 Drawing Sheets

METHOD FOR CONTROLLING THE STORAGE PRESSURE IN A CLOSED LEVEL CONTROL SYSTEM

FIELD OF THE INVENTION

The invention relates to a method for controlling the storage pressure of a pressurized air store of a closed level control system for a motor vehicle. The level control system includes: a compressor, a pressurized air store and at least one air spring. The pressurized air store can be filled with air from the atmosphere and can be discharged into the atmosphere. The air spring is connected to the pressurized air store via the compressor in such a manner that pressurized air can be transferred from the air spring into the pressurized air store and can be transferred in the reverse direction.

BACKGROUND OF THE INVENTION

A level control system of this kind is, for example, disclosed in U.S. Pat. No. 6,685,174. This level control system makes it possible to maintain the vehicle body of a motor vehicle at normal level. For this purpose, pressurized air is transferred from the pressurized air store into the air springs of the level control system in order to raise the vehicle body of the motor vehicle or pressurized air is transferred from the air springs via the compressor into the pressurized air store to lower the vehicle body when the vehicle body is no longer at the pregiven normal level. The storage pressure of the pressurized air store must lie within a specific range when the vehicle body is at the pregiven normal level in order to make possible, on the one hand, a rapid lifting of the vehicle body and, on the other hand, a rapid lowering of the vehicle body. If the storage pressure in the pressurized air store is too high, then a rapid lifting of the vehicle is possible but a rapid lowering of the vehicle body is not because, in this case, the pressurized air must be transferred from the air springs against the high storage pressure in the pressurized air store. The same applies when the storage pressure in the pressurized air store is too low which makes possible a rapid lowering of the vehicle body but not a rapid raising thereof.

The storage pressure of the pressurized air store varies because of different loading conditions and different level settings, which are inputted by the driver or by the control of the level control system (for example, in order to provide greater road clearance in an off-road vehicle). This can lead to the condition that the storage pressure lies outside of the desired range because of the instantaneous loading state and/or the instantaneous level setting of the vehicle body even though the storage pressure would lie within this range if the vehicle body would be disposed in the pregiven normal state. If the storage pressure is determined at such a time point, then this would lead to a filling of the pressurized air store with air from the atmosphere or lead to a discharge of the pressurized air store into the atmosphere even though this should not actually occur. Rather, only leakage losses or storage pressure fluctuations should be compensated in the pressurized air store via filling or discharge. The leakage losses and storage pressure fluctuations arise because of intense temperature fluctuations. One could solve the problem in that the storage pressure is only determined when the vehicle body is at the normal level but this often does not occur over a long time span.

SUMMARY OF THE INVENTION

It is an object of the invention to provide a method for controlling the storage pressure of the pressurized air store of a closed level control system. It is another object of the invention to provide such a method which ensures as far as possible that the storage pressure lies within a specific range and that the pressurized air store is not unnecessarily filled with pressurized air from the atmosphere or is discharged into the atmosphere. Preferably, the storage pressure should lie in a specific range for a specific state of the motor vehicle in order to ensure a rapid lifting or lowering of the vehicle body.

The method of the invention is for controlling the storage pressure of a pressurized air store of a closed level control system for a motor vehicle, the closed level control system holding an air quantity and including a compressor, the pressurized air store which can be filled with air from the atmosphere and which can be discharged to the atmosphere, at least one air spring communicating via the compressor with the pressurized air store so as to permit a transfer of pressurized air from the air spring into the pressurized air store and from the pressurized air store into the air spring, the method including the steps of: determining the air quantity in the closed level control system; filling the pressurized air store with air from the atmosphere when the air quantity lies below a lower limit; discharging the pressurized air store into the atmosphere when the air quantity lies above an upper limit; and, controlling the storage pressure of the pressurized air store so as to cause the quantity to lie in an operating range between the upper and lower limits after the filling of the pressurized air store or after the discharging of the pressurized air store.

The basic idea of the invention is that the air quantity is maintained virtually always in a specific operating range and, as a consequence thereof, the storage pressure also lies in a specific range for a specific state of the motor vehicle. The operating range for the air quantity is preferably so selected that the storage pressure lies in a range for a specific normal state of the motor vehicle in which, on the one hand, a rapid raising is possible and, on the other hand, a rapid lowering of the vehicle body is possible.

An advantage achieved with the invention is especially that the method for controlling the storage pressure can be carried out at any desired time point and for any desired state of the motor vehicle because, with the method, only the air quantity (which air quantity is independent of the instantaneous state of the motor vehicle) is determined in the level control system and is checked as to whether this air quantity is in a specific operating range. A further advantage of the invention is that the storage pressure is only adapted by filling or discharging of the pressurized air store when the air quantity in the level control system lies outside of the operating range (and therefore the storage pressure lies outside of the desired range) because of leakage or large temperature fluctuations. The compressor is therefore only actuated for filling the pressurized air store when this is absolutely necessary so that the compressor running times are shortened and the compressor service life is lengthened. A further advantage of the invention is that the air quantity in the level control system can be determined in a simple manner.

To carry out the method, the air quantity can be determined in all components of the level control system, that is, in the air springs, the pressurized air store, the compressor, the air dryer and the pressurized air lines. According to a further embodiment of the invention, the air quantity in the level control system is, however, determined from the sum of the air quantities in the air springs and the air quantity in the pressurized air store. Here, it is assumed that the air quantity in the other components of the level control system can be neglected compared to the above-mentioned components. The advantage of this feature is that the air quantity in the air springs and in the pressurized air store can be determined in a simple manner with the aid of the elevation sensors of the level control system and a central pressure sensor.

According to another feature of the invention, the pressurized air store is so filled or discharged that the air quantity after filling or discharge lies at least close to the center of the operating range (preferably the air quantity corresponds to precisely this value). The advantage of this feature is that the air quantity in the pressurized air store has the largest possible fluctuation range before it moves out of the operating range and the air quantity has to be again readjusted.

The advantage achieved with this embodiment is that the compressor need only be switched on once for a specific time span in order to fill the pressurized air store or the discharge valve through which the pressurized air flows from the pressurized air store into the atmosphere need only be opened for a specific time span. In this way, a follow-up measurement as to whether the air quantity has reached the desired value after a compressor running time or a discharge valve opening time is unnecessary and so is a renewed switch-on of the compressor or a switchover of the exhaust valve. Preferably, the mean air quantity value of the operating range as a pregiven air quantity forms the basis for the computation of the time span in order to achieve, in addition, the last-mentioned advantage.

According to still another feature of the invention, the operating range is so selected that the air quantity in the level control system lies at least most of the time within the operating range also for temperature fluctuations in the course of a longer time span. As a time span, the length of a day can, for example, be considered. In this case, the operating range can, for example, be fixed in that the mean air quantity of the operating range at 15° C. is included and the lower and upper limits of the operating range at 15° C.+/−20° C. are included. The air quantity then does not move out of the operating range in a temperature range from −5° C. to 35° C. (other temperatures can be fixed in dependence upon the time of year or region in which the motor vehicle is manufactured). The advantage of this embodiment is that the air quantity does not move out of the operating range because of temperature fluctuations over the above-mentioned time span and a readjustment within this time span because of the temperature fluctuations is not necessary.

According to still another embodiment of the invention, the air quantity in the level control system is determined when the motor vehicle is taken into service (preferably each time the vehicle is used). An advantage of this embodiment is that the air quantity can be corrected in advance of a trip with the motor vehicle without any kind of danger or problem. A further advantage of this embodiment is that, at standstill of the motor vehicle, the air quantity in the pressurized medium chambers can be precisely measured in a simple manner because no dynamic influences act on the motor vehicle and on the pressurized medium chambers.

According to another embodiment of the invention, the method includes the further steps of: forming a mean value over a long time duration from air quantities determined during the time duration; comparing the mean value to at least one mean value determined previously in a corresponding manner; and, concluding a presence of leakage of the level control system from a drop of the mean value.

In the above, a time span of between 10 to 90 days can be taken as a basis. Accordingly, if the time span is 10 days, then the arithmetic mean value during ten sequential days is determined from the air quantities measured in this time span and is compared to one or several previously measured mean values in order to draw a conclusion as to leakage in the level control system (for example, a mean value is determined for the time span from January $1^{st}$ to January $10^{th}$, from January $2^{nd}$ to January $11^{th}$, from January $3^{rd}$ to January $12^{th}$, et cetera; when the last determined mean value has dropped relative to the one or more previously determined mean values, a conclusion as to a leakage in the level control system can be drawn). The advantage of this embodiment is that, with the formation of mean values (over a longer time span), temperature fluctuations, which influence the air quantity determination, are smoothed out. If a conclusion is drawn as to a leakage in the level control system, this can be displayed to the vehicle driver, for example, and/or can be stored in a fault memory of the motor vehicle. The fault memory is read out during the next inspection of the motor vehicle and the leakage of the level control system can be corrected.

According to another embodiment of the invention, the mean value of the operating range is fixed in other specific levels starting with the following: a specific ambient temperature, a specific loading state, a specific normal level of the vehicle body and specific minimum control times for the raising or lowering of the vehicle body from the normal level. The operating range for the air quantity is fixed starting from a mean value. Here, for the ambient temperature, loading state and normal level, values are fixed which the vehicle often assumes. The advantage of this embodiment is that the operating range is fixed starting from a normal state of the motor vehicle and that a rapid lifting or lowering of the vehicle body from the normal level to specific levels is ensured.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
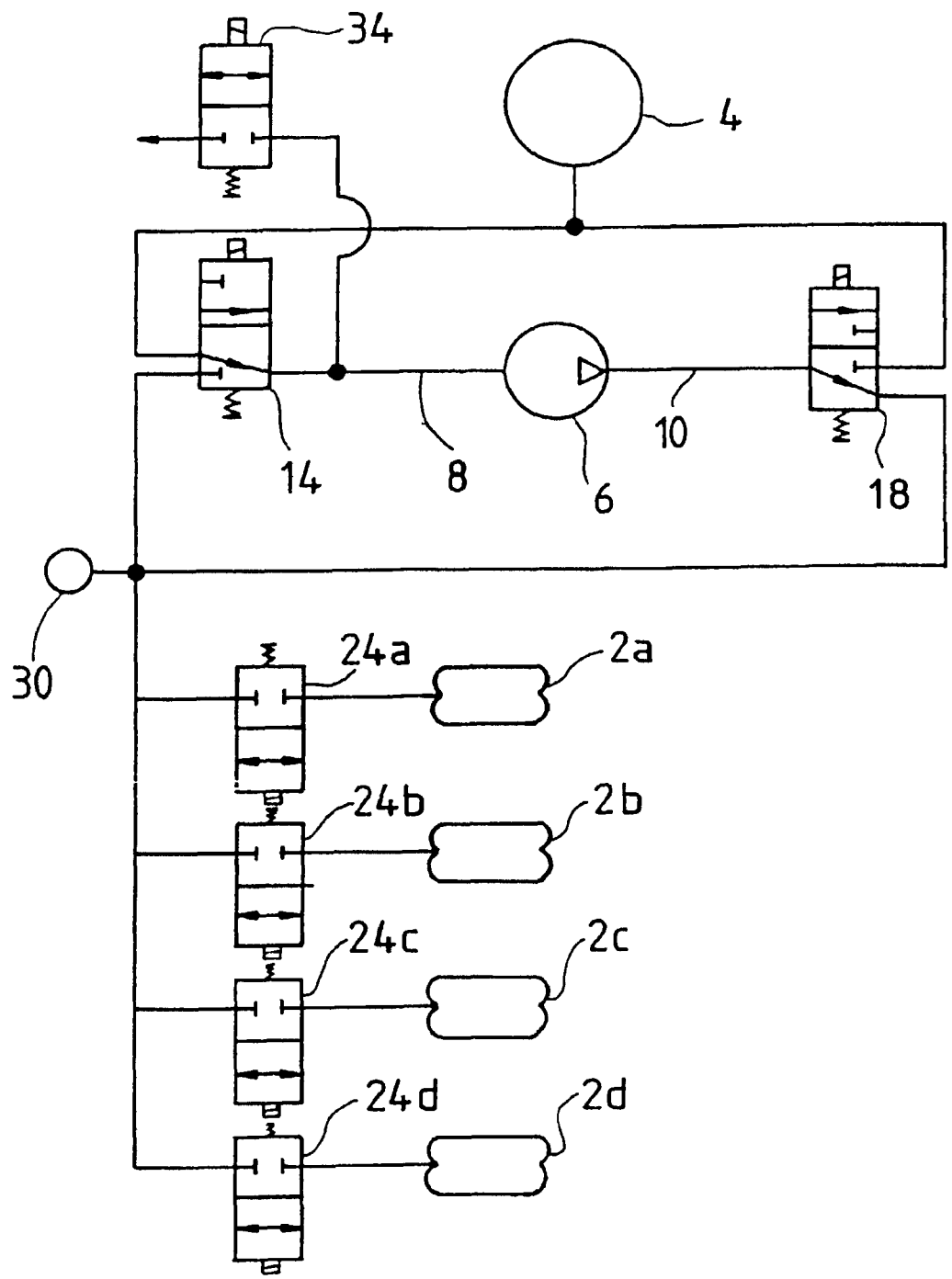
FIG. 1 is a schematic of a closed level control system with which the method of the invention can be carried out; and, FIG. 2 is a graph showing the control speed v plotted as a function of the air quantity L in the level control system.

FIG. 1 shows a closed level control system and a detailed explanation with respect to the configuration and operation thereof is provided in U.S. Pat. No. 6,685 174, and incorporated herein by reference.

The level control system includes air springs 2a to 2d and a pressurized air store 4. In addition, the level control system includes a compressor 6, which can convey pressurized air from its input 8 to its output 10. The above-mentioned components are connected to each other via pressurized air lines in which controllable directional valves (14, 18) and (24a to 24d) are mounted.

In the following, an explanation will be provided with respect to air spring 2a as to how pressurized air can be transferred from the pressurized air store 4 via the compressor 6 into the air springs 2a to 2d. First, the control unit (not shown) of the level control system drives the controllable directional valve 24a so that this valve transfers from the first switching state shown in FIG. 1 into the second switching state. Thereafter, the compressor 6 is driven by the control unit so that it starts to run. Pressurized air is then transferred from the pressurized air store 4 into the air spring 2a via the controllable directional valve 14, the compressor 6, the controllable directional valve 18 and the controllable directional valve 24a. When sufficient pressurized air has been transferred into the air spring 2a (the vehicle body has assumed the desired level in the region of the air spring 2a), then the compressor 6 is again driven by the control unit so that the compressor stops running and, furthermore, the controllable directional valve 24a is no longer supplied with current so that it returns to its first switching state. The air springs 2b to 2d can be filled with pressurized air from the pressurized air store 4 in a corresponding manner (here, a simultaneous filling of several air springs 2a to 2d is possible).

In the following and based on air spring 2a by way of example, it will be explained how pressurized air can be transferred from the air springs 2a to 2d via the compressor 6 into the pressurized air storage 4. First, the electrically controllable directional valves 14, 18 and 24a are so driven by the control unit of the level control system that they transfer from the switching state shown in FIG. 1 into the second switching state. Thereafter, the compressor 6 is driven by the control unit so it starts to run. Pressurized air is then transferred from the air spring 2a into the pressurized air store via the directional valve 24a, the directional valve 14, the compressor 6 and the directional valve 18. When sufficient pressurized air has been discharged from the air spring 2a into the pressurized air store 4 (when the vehicle body in the region of air spring 2a has assumed the desired level), the compressor 6 is driven by the control unit so that it stops running. Furthermore, the controllable directional valves 14, 18 and 24a are no longer supplied with current so that they return to their first switching state. In the same way, the air springs 2b to 2d can be discharged into the pressurized air store 4 (here, a simultaneous discharge of several air springs 2a to 2d is also possible).

A rapid lifting of the vehicle body from a pregiven normal level by filling the air springs 2a to 2d with pressurized air from the pressurized air store 4 can only be ensured when the storage pressure in the pressurized air store 4 is sufficiently high. On the other hand, a rapid lowering of the vehicle body from a level, which is too high, into the normal level can only be ensured by discharging the air springs 2a to 2d into the pressurized air store 4 when the storage pressure in the pressurized air store 4 is not too high. Accordingly, and to ensure a lifting of the vehicle body and a lowering of the vehicle body at a certain minimum speed, the storage pressure in the pressurized air store 4 must lie within a specific range when the vehicle assumes the normal state. The vehicle is often outside of the normal state because of different loading conditions and different level adjustments. For this reason, the storage pressure of the pressurized air store 4 cannot be easily determined in the normal state of the motor vehicle. According to the invention, the storage pressure in the pressurized air store 4 is therefore controlled indirectly via the air quantity in the level control system in that this air quantity is determined and is held in a specific operating range. If required, this air quantity is maintained by filling the pressurized air store 4 with air from the atmosphere or by discharging the pressurized air store 4 into the atmosphere. The operating range is so selected that, in the normal state of the motor vehicle, the storage pressure in the pressurized air store 4 lies in the desired range.

If the pressurized air store 4 is to be filled with pressurized air from the atmosphere, then the controllable directional valves 34 and 18 are first driven by the control unit of the level control system so that these valves transfer from the first switching state shown in FIG. 1 into the second switching state. Thereafter, the compressor is driven so that it begins to run. Then, air is transferred from the atmosphere into the pressurized air store 4 via the directional valve 34, the compressor 6 and the directional valve 18. If no more air is to be transferred from the atmosphere into the pressurized air store 4, then the controllable directional valves 34 and 18 are no longer supplied with current by the control unit so that these valves transfer back into the first switching state. Furthermore, the compressor 6 is no longer driven so that it stops running.

To discharge pressurized air from the pressurized air store 4, the controllable directional valve 34 is driven by the control unit of the level control system so that this valve transfers from the first base state shown in FIG. 1 into the second switching state. The pressurized air store 4 can then discharge into the atmosphere via the directional valves 14 and 34. If the pressurized air store 4 is not to be discharged further, then the controllable directional valve 34 is no longer supplied with current by the control unit of the level control system so that this valve again returns to the first switching state shown in FIG. 1.

In the following, a description is provided as to how the air quantity L in the level control system is determined. It has been shown that, for carrying out the method of the invention, it is sufficient when the air quantity in the pressurized air store 4 and the air quantity in the air springs 2a to 2d is determined. This air quantity L is computed as follows:

$$L = p_1 v_1 + p_2 v_2 + p_3 v_3 + p_4 v_4 + p_s v_s;$$

wherein:

$p_1$ to $p_4$ is the pressure in the air springs 2a to 2d;
$v_1$ to $v_4$ are the volumes of the air springs 2a to 2d;
$p_s$ is the pressure in the pressurized air store 4; and,
$v_s$ is the volume of the pressurized air store 4.

Based on the air spring 2a, it will be explained how the pressure pi in the air springs 2a to 2d can be determined with the pressure sensor.

First, the controllable directional valve 18 is driven by the control unit so that this valve transfers from the first switching state shown in FIG. 1 into the second switching state. The air springs 2a to 2d are then completely separated from the compressor 6 and the pressurized air store 4. Thereafter, the controllable directional valve 24a is driven by the control unit of the level control system so that this valve transfers from the first switching state shown in FIG. 1 into the second switching state. The pressure in the air spring 2a is then applied to the pressure sensor 30 so that this pressure is measured and transmitted further to the control unit of the level control system. If the pressure should not be measured further, then the directional valves 18 and 24a are no longer supplied with current by the control unit so that these valves again return to the first switching state shown in FIG. 1. The pressure in the air springs 2b to 2d can be correspondingly measured.

For determining the volume $v_1$ in the air spring 2a, the deflected state of the air spring 2a is measured with the elevation sensor (not shown) assigned to the air spring 2a and the measured deflected state is transmitted to the control unit of the level control system. The volume of the air spring 2a which corresponds to the instantaneous deflection state is stored in the control unit so that the volume of the air spring 2a can be determined from the transmitted signal of the elevation sensor. The volumes of the air springs 2b to 2d can be determined in a corresponding manner.

To determine the pressure in the pressurized air store 4, the controllable directional valves 14 and 18 first assume the first switching state shown in FIG. 1. The pressurized air store 4 is then connected via these valves to the pressure sensor 30 so that a pressure equalization takes place between the pressurized air store 4 and the pressure sensor 30 when the pressure in the pressurized air store 4 is greater than at the pressure sensor 30. Thereafter, the controllable directional valves 14 and 18 are transferred from the first switching state into the second switching state. The pressure sensor 30 is then connected to the pressurized air store 4 via the controllable directional valve 14, the compressor 6 and the controllable directional valve 18 so that a pressure equalization takes place between the pressure sensor 30 and the pressurized air store 4 when the pressure at the pressure sensor 30 is greater than in the pressurized air store 4. When the directional valves 14 and 18 are transferred into the two switching states in advance of the pressure measurement, the pressure sensor 30 lies, in any event, at the static air pressure in the pressurized air store 4 and can therefore be measured by the sensor. The pressure, which is measured by the pressure sensor 30, is transmitted to the control unit of the level control system.

The volume $v_s$ of the pressurized air store 4 is stored in the control unit of the level control system so that all quantities, which are necessary for computing the air quantity L, are present in the control unit of the level control system.

Figure 2:
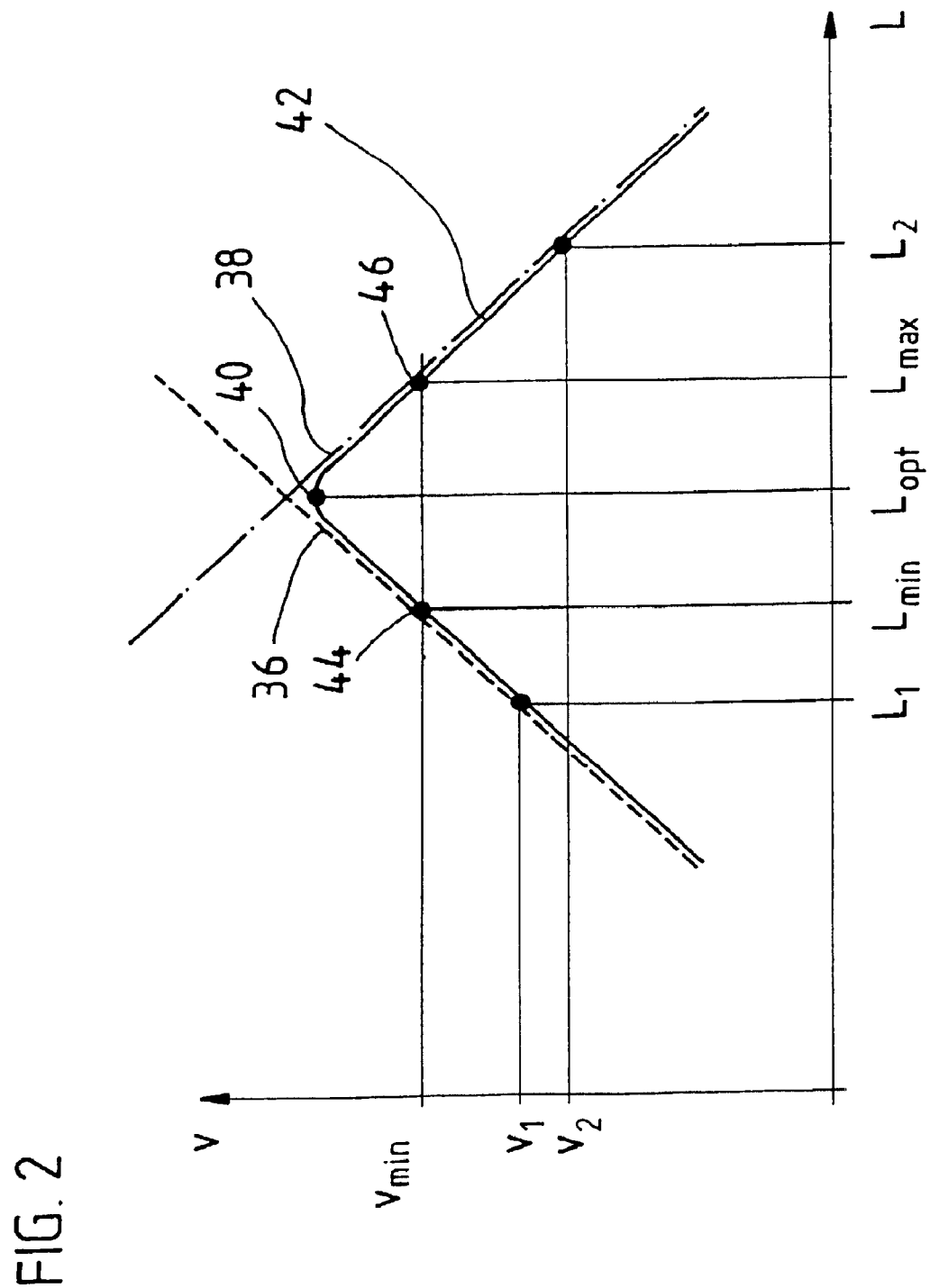

FIG. 2 shows a diagram wherein the control speed v is plotted as a function of the air quantity L in the level control system. The diagram of FIG. 2 shows a first straight line 36 which reflects the control speed v for raising the vehicle body from a specific normal level in dependence upon the air quantity L. When the air quantity L is low, this means that the storage pressure in the pressurized air store 4 is low so that a low control speed v results. The larger the air quantity L is, the more rapidly the vehicle body can be raised with the aid of the air from the pressurized air store 4.

The straight line 38 shows the control speed v for lowering the vehicle body having a pregiven average load from a pregiven normal level in dependence upon the air quantity L. The lower the air quantity L, the more rapidly can the pressurized air be transferred from the air springs 2a to 2d via the compressor into the pressurized air store 4 to lower the vehicle body and the more rapidly a lowering of the vehicle body is possible.

The two straight lines 36 and 38 intersect at a point which corresponds to a specific air quantity $L_{opt}$. For the air quantities L, which lie to the left of $L_{opt}$, the lowering operation takes place more rapidly than the lifting operation and for those air quantities, which lie to the right of $L_{opt}$, the lifting takes place more rapidly than the lowering. The curve 42 combines the straight lines 36 and 38. Only the slower control speeds are retained on the curve 42 (that is, the control speeds v for raising the vehicle body are shown by the curve 42 to the left of the apex 40 to which the air quantity $L_{opt}$ corresponds and to the right of the apex 40, the control speeds v for lowering the vehicle body are provided by the curve 42).

If, for any desired selectable speed $v_{min}$, a straight line is drawn below the apex 40 parallel to the L axis, then this line intersects the curve 42 at two points 44 and 46. If the air quantity L in the level control system lies between the air quantities $L_{min}$ and $L_{max}$, which are fixed by the points 44 and 46, then it is ensured that lifting and lowering the vehicle takes place at a control speed v which is equal to or greater than the speed $v_{min}$. The axis, which passes through the points 44 and 46, therefore fixes a closed air quantity interval from $L_{min}$ to $L_{max}$ and, for each air quantity L in this interval, the selected minimum control speed vmin for lifting and lowering is maintained or exceeded (the closed air quantity interval from $L_{min}$ to $L_{max}$ is, in the following, identified as an operating range). For air quantities L, which lie outside of the operating range, the control speed drops below the minimum control speed $v_{min}$ for raising or lowering.

The air quantity L in the level control system is controlled in that it is determined and:
(a) the pressurized air store 4 is filled with air from the atmosphere when the air quantity lies below the lower limit $L_{min}$; and,
(b) the pressurized air store 4 is discharged into the atmosphere when the air quantity lies above the upper limit $L_{max}$. The control is undertaken in such a manner that the air quantity lies in the operating range after filling or discharging.

EXAMPLES

For air quantities, which are lower than the air quantity $L_{min}$, the lowest control speed $v_{min}$ for raising the vehicle body can no longer be maintained. For example, if the air quantity has fallen below $L_{min}$ to $L_1$, then the control speed v for raising the vehicle body is $v_1$, which is less than the minimum control speed $v_{min}$. If, during the determination of the air quantity in the level control system, it is determined that the air quantity L in the level control system amounts to only $L_1$, that is, less than $L_{min}$, then the pressurized air store 4 is filled with air from the atmosphere until the air quantity L again lies in the operating range.

Preferably, filling of the pressurized air store 4 is undertaken until the air quantity L in the level control system again assumes the air quantity $L_{opt}$ because this air quantity $L_{opt}$ lies in the center of the operating range and, in this way, the air quantity in the level control system after filling has the maximum fluctuation range until it again moves out of the operating range.

The time span over which the pressurized air store 4 must be filled can, for example, be determined as follows. First, the difference $L_{opt}-L_1$ is determined. This difference determines that air quantity $L_{auf}$ which must be brought into the level control system in order to come from the air quantity $L_1$ to the air quantity $L_{opt}$. Thereafter, with the aid of the compressor 6 of the air control system, air is transferred from the atmosphere into the pressurized air store 4 until the air quantity $L_{auf}$ has been transferred into the pressurized air store 4 (see FIG. 1 with respect to filling the pressurized air store with the aid of the compressor 6). The required time span can be determined from a characteristic line stored in the control unit of the level control system. This characteristic line defines, for all air quantities $L_{auf}$ conceivable in the level control system, the relationship between the air quantity $L_{auf}$ which is to be moved by the compressor in each case and the compressor running time. The air quantity $L_{auf}$ is maximally $L_{opt}$ (when the level control system was empty before filling) and is minimally 0 when the air quantity in the level control system corresponds to $L_{opt}$.

If it is determined in the determination of the air quantity in the level control system that the actual air quantity $L_2$ in the level control system is greater than the air quantity $L_{max}$, then this means that the lowering of the vehicle body takes place at a control speed $v_2$, which is less than the minimum control speed $v_{min}$. In this case, pressurized air is discharged from the pressurized air store 4 until the pressurized air, which is present in the level control system, lies again in the operating range. Preferably, pressurized air is discharged from the pressurized air store 4 until the actual air quantity L in the level control system corresponds to the air quantity $L_{opt}$ as explained above. The time span over which the pressurized air must be discharged can be determined as follows. First, the difference $L_2-L_{opt}$ is determined. This difference yields that air quantity $L_{ab}$ which must be discharged from the level control system in order to arrive at the air quantity $L_{opt}$ from the air quantity $L_2$. Thereafter, pressurized air is discharged from the pressurized air store 4 until the air quantity $L_{ab}$ has escaped as is explained in connection with FIG. 1. The required time span can be determined from a characteristic line stored in the control unit of the level control system and this characteristic line provides, for all conceivable air quantities $L_{ab}$ in the level control system, the relationship between the particular air quantity $L_{ab}$, which is to be discharged, and the discharge time necessary therefor.

With the method explained above, the actual air quantity L in the level control system is brought to the air quantity $L_{opt}$ after the actual air quantity in the level control system has been outside of the operating range.

If the actual air quantity L lies within the operating range, then it can happen that this air quantity L varies because of temperature fluctuations over a specific time duration, without the level control system having leakage. Accordingly, if the air quantity L would come to lie outside of the operating range because of the conventional temperature fluctuations, then this would lead to control operations in the level control system even though they are not necessary. In order to prevent this, the operating range is selected so large that the air quantity L, which varies within a fixed time duration because of the temperature fluctuations, lies virtually always within the operating range. As a time duration for the temperature fluctuations, the duration of a day can, for example, be assumed and for the magnitude of the temperature fluctuation, a range from −20° C. to +20° C. can, for example, be fixed.

It is understood that the foregoing description is that of the preferred embodiments of the invention and that various changes and modifications may be made thereto without departing from the spirit and scope of the invention as defined in the appended claims.

What is claimed is:

1. A method for controlling the storage pressure of a pressurized air store of a closed level control system for a motor vehicle, the closed level control system holding an air quantity and including a compressor, said pressurized air store which can be filled with air from the atmosphere and which can be discharged to the atmosphere, at least one air spring communicating via said compressor with said pressurized air store so as to permit a transfer of pressurized air from said air spring into said pressurized air store and from said pressurized air store into said air spring, the method comprising the steps of:

determining said air quantity in said closed level control system;

filling said pressurized air store with air from the atmosphere when said air quantity lies below a lower limit;

discharging said pressurized air store into the atmosphere when said air quantity lies above an upper limit; and, controlling the storage pressure of said pressurized air store so as to cause said quantity to lie in an operating range between said upper and lower limits after said filling of said pressurized air store or after said discharging of said pressurized air store.

2. The method of claim 1, said closed level control system including a plurality of said air springs; and, the method comprising the further step of determining said air quantity from the sum of the air quantities in said air springs and the air quantity in said pressurized air store.

3. The method of claim 2, comprising the further step of filling or discharging said pressurized air store so as to cause said air quantity of said closed level control system to lie at least close to the center of said operating range.

4. The method of claim 1, comprising the further steps of:

determining the air quantity in said level control system;

subtracting the determined air quantity from a pregiven air quantity, which lies within said operating range, to form a difference;

determining a time span from said difference over which said pressurized air store must be filled or discharged in order to go from the determined air quantity to the pregiven air quantity; and, filling or discharging said pressurized air store over said time span.

5. The method of claim 1, comprising the further step of so selecting said operating range that said air quantity in said level control system at least mostly remains within said operating range even in the presence of temperature fluctuations in the course of a longer time span.

6. The method of claim 1, comprising the further step of determining said air quantity in said level control system when said motor vehicle is started.

7. The method of claim 1, comprising the further steps of:

forming a mean value over a long time duration from air quantities determined during said time duration;

comparing said mean value to at least one mean value determined previously in a corresponding manner; and, concluding a presence of leakage of said level control system from a drop of the mean value.

8. The method of claim 7, wherein the mean value of the operating range is fixed proceeding from the following: a specific ambient temperature; a specific loading state; a specific normal level of the vehicle body; and, specific minimum control times for the raising and lowering, respectively, of the vehicle body from said normal level into other specific levels.

9. A method for controlling the storage pressure of a pressurized air store of a closed level control system for a motor vehicle, the closed level control system holding an air quantity and including a compressor, said pressurized air store which can be filled with air from the atmosphere and which can be discharged to the atmosphere, at least one air spring communicating via said compressor with said pressurized air store so as to permit a transfer of pressurized air from said air spring into said pressurized air store and from said pressurized air store into said air spring, the method comprising the steps of:

determining said air quantity in said closed level control system;

filling said pressurized air store with air from the atmosphere when said air quantity lies below a lower limit;

discharging said pressurized air store into the atmosphere when said air quantity lies above an upper limit; and, controlling the storage pressure of said pressurized air store so as to cause said quantity to lie in an operating range between said upper and lower limits after said filling of said pressurized air store or after said discharging of said pressurized air store, wherein said pressurized air store is only filled or discharged when the air quantity in the level control system lies outside of the operating range because of large temperature fluctuations.

10. A method for controlling the storage pressure of a pressurized air store of a closed level control system for a motor vehicle, the closed level control system holding an air quantity and including a compressor, said pressurized air store which can be filled with air from the atmosphere and which can be discharged to the atmosphere, at least one air spring communicating via said compressor with said pressurized air store so as to permit a transfer of pressurized air from said air spring into said pressurized air store and from said pressurized air store into said air spring, the method comprising the steps of:

determining said air quantity in said closed level control system;

filling said pressurized air store with air from the atmosphere when said air quantity lies below a lower limit;

discharging said pressurized air store into the atmosphere when said air quantity lies above an upper limit; and, controlling the storage pressure of said pressurized air store so as to cause said quantity to lie in an operating range between said upper and lower limits after said filling of said pressurized air store or after said discharging of said pressurized air store, wherein said pressurized air store communicates with said at least one air spring so as to permit a transfer of pressurized air from said pressurized air store into said at least one air spring and from said at least one air spring into said pressurized air store.

* * * * *